(12) United States Patent
Sasaki et al.

(10) Patent No.: US 6,764,135 B2
(45) Date of Patent: Jul. 20, 2004

(54) ATTACHMENT FOR CHILD SEAT

(75) Inventors: Keiji Sasaki, Saitama (JP); Tsutomu Terasaki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 143 days.

(21) Appl. No.: 09/728,119

(22) Filed: Dec. 4, 2000

(65) Prior Publication Data

US 2001/0010431 A1 Aug. 2, 2001

(30) Foreign Application Priority Data

Jan. 27, 2000  (JP) ........................................ 2000-018560

(51) Int. Cl.$^7$ ................................................ A47D 1/10
(52) U.S. Cl. .............................. 297/256.16; 297/250.1; 297/463.1
(58) Field of Search ......................... 297/256.16, 250.1, 297/253, 463.1, 256

(56) References Cited

U.S. PATENT DOCUMENTS

| | | | | |
|---|---|---|---|---|
| 3,779,599 A | * | 12/1973 | Gottfried .................... | 297/253 |
| 3,922,035 A | * | 11/1975 | Wener .................... | 297/256.13 |
| 4,660,889 A | * | 4/1987 | Anthony et al. ............. | 297/467 |
| 4,876,770 A | * | 10/1989 | Bougher ....................... | 24/170 |
| 4,915,446 A | * | 4/1990 | Darling et al. .......... | 297/256.17 |
| 5,031,962 A | * | 7/1991 | Lee ............................ | 297/484 |
| 5,265,931 A | * | 11/1993 | Ryan .......................... | 297/130 |
| 5,383,708 A | * | 1/1995 | Nagasaka et al. ......... | 297/250.1 |
| 5,466,044 A | * | 11/1995 | Barley et al. ................ | 297/252 |
| 5,468,046 A | * | 11/1995 | Weber et al. ................ | 297/238 |
| 5,716,095 A | * | 2/1998 | Lopez ................... | 297/184.13 |
| 5,833,309 A | * | 11/1998 | Schmitz ................. | 297/180.11 |
| 5,839,789 A | * | 11/1998 | Koledin ....................... | 297/476 |
| 5,954,397 A | * | 9/1999 | Czernakowski et al. . | 297/250.1 |
| 5,979,982 A | * | 11/1999 | Nakagawa ................ | 297/250.1 |
| 6,017,087 A | * | 1/2000 | Anthony et al. .......... | 297/250.1 |
| 6,183,044 B1 | * | 2/2001 | Koyanagi et al. ...... | 297/256.16 |
| 6,209,957 B1 | * | 4/2001 | Baloga et al. .............. | 297/253 |
| 6,338,529 B1 | * | 1/2002 | David et al. ............. | 297/250.1 |
| 6,390,562 B1 | * | 5/2002 | Takamizu et al. ........... | 297/483 |
| 6,402,251 B1 | * | 6/2002 | Stoll .......................... | 297/485 |
| 6,505,887 B2 | * | 1/2003 | Hampton .................. | 297/256.1 |

FOREIGN PATENT DOCUMENTS

| | | |
|---|---|---|
| JP | 55-153975 | 11/1980 |
| JP | A 6 336134 | 12/1994 |

* cited by examiner

Primary Examiner—Rodney B. White
Assistant Examiner—Stephanie Harris
(74) Attorney, Agent, or Firm—Arent Fox Kintner Plotkin & Kahn

(57) ABSTRACT

The attachment 1 comprises the frame 6 having a seat side part 4, which faces a seat part 2a of a vehicle seat 2 and supports the backside of a seat part 3a of a child seat 3, and a back side part 5, which faces a back part 2b of the vehicle seat 2 and supports the backside of a back part 3b of the child seat 3; an first engagement part 8 made into engagement detachably with a second engagement part 7 provided on the back part 2b of the vehicle seat 2; and a fixing belt 9 fixing the child seat 3 to the frame 6.

10 Claims, 5 Drawing Sheets

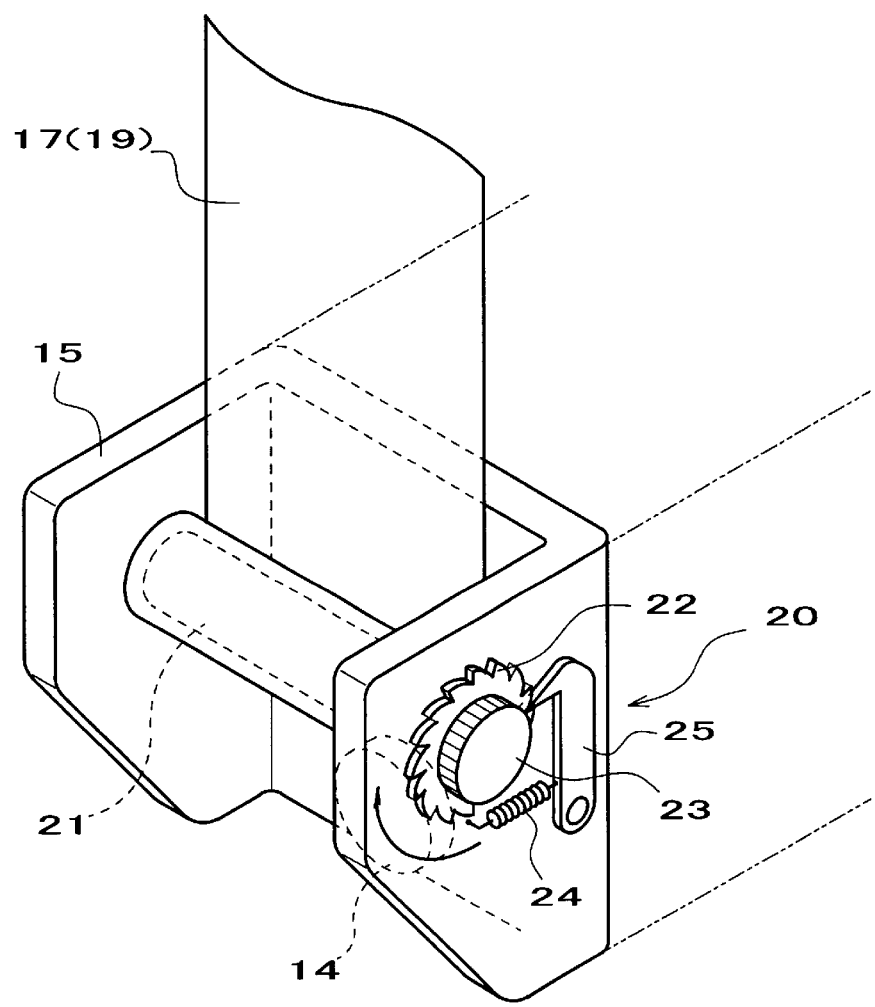

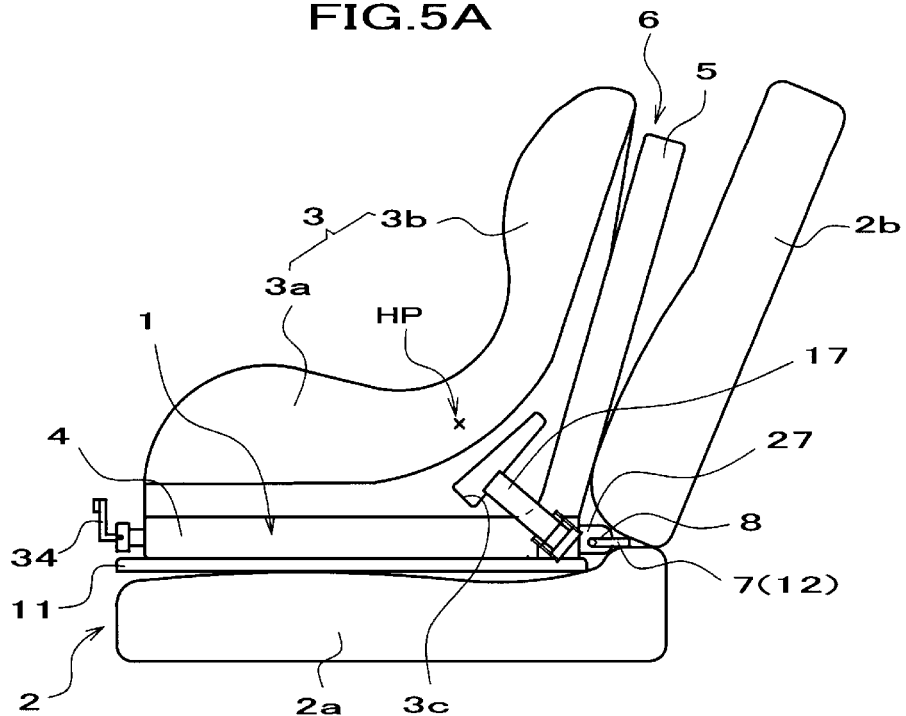
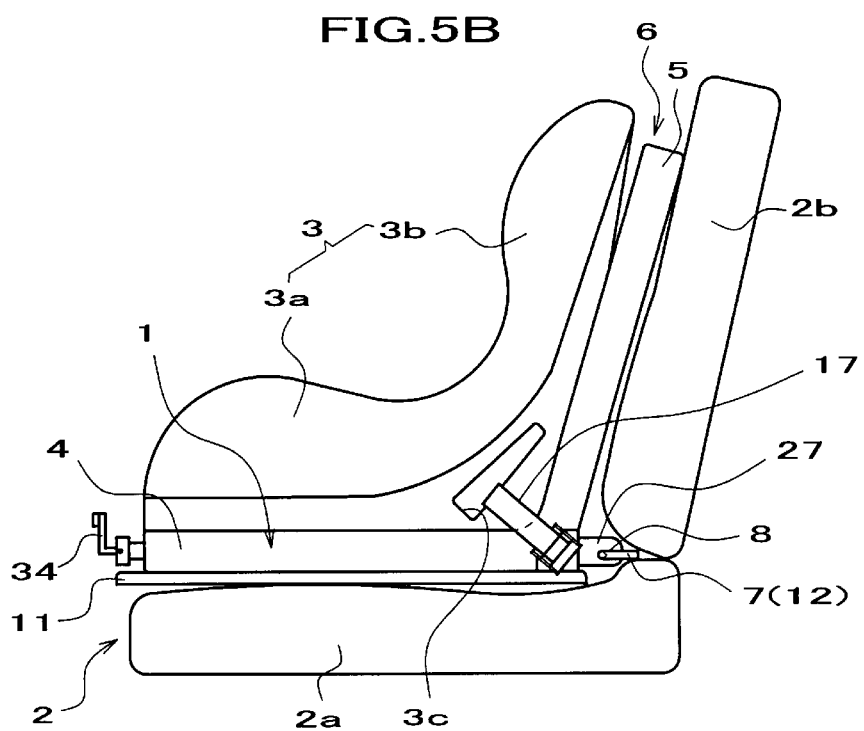

ATTACHMENT FOR CHILD SEAT

FIELD OF THE INVENTION

The present invention relates to an attachment for attaching a child seat to a vehicle seat.

BACKGROUND OF THE INVENTION

A conventional attaching form for a child seat utilizes a vehicle seatbelt included as standard equipment of a vehicle. For example, after a vehicle seatbelt is engaged in the likes of an opening formed on the side of the bottom of a child seat, the vehicle seatbelt is fastened and adjusted, and the child seat fixed to a vehicle seat. However, in this attaching form, the vehicle seatbelt is fastened in a state in which the child seat is provided on the vehicle seat. Therefore, various studies point out problems such as difficulty of fastening and adjusting because of tight spaces.

To attach a child seat easily with higher reliability, "ISO-FIX" standard in Europe and "child restraint anchorage system" standard in the U.S. are enacted into law as new attaching method to fix a child seat to a vehicle seat without having to use a vehicle seatbelt. These standards define that a special engagement part (anchor) must be provided on the side of a vehicle seat, and a engagement part, which has a predetermined shape to be made into engagement with the anchor, must be provided on the side of a child seat.

In regard to attaching a child seat based on the above-mentioned standards, each of a vehicle seat and a child seat needs to support the above-mentioned standards. Therefore, an existing conventional type of child seat currently on the market in large quantity cannot benefit from the effects of these new standards offering a superior level of convenience and safety.

The present invention is designed to solve such problem. An object of the present invention is to provide an attachment for a child seat, which can fix a conventional child seat to a vehicle seat with ease and reliability without having to use a vehicle seatbelt. When an anchor on the side of a vehicle seat supports the "ISO-FIX" standard or "child restraint anchorage system" standard, the attachment can fix the conventional child seat on the basis of these standards.

SUMMARY OF THE INVENTION

To achieve the above-mentioned object, the present invention provides an attachment for a child seat comprising:
  a frame having a seat side part, which faces a seat part of a vehicle seat and supports the backside of a seat part of a child seat, and a back side part, which faces a back part of the vehicle seat and supports the backside of a back part of the child seat;
  a first engagement part made into engagement detachably with a second engagement part provided on the back part of the vehicle seat; and
  a fixing belt fixing the child seat to the frame. According to the attachment, a conventional child seat, which is fixed by a vehicle seatbelt, can be fixed to a vehicle seat with ease and reliability without having to use a vehicle seatbelt. When the vehicle seat supports the "ISO-FIX" standard or "child restraint anchorage system" standard, the above-mentioned conventional child seat can be fixed on the basis of these standards.

The attachment for a child seat further comprises an adjusting means adjusting the first engagement part in a state in which the first engagement part can be moved and positioned with respect to the frame. Therefore, the position (posture) of the child seat with respect to the vehicle seat when attaching can be optimized.

The first engagement part can be moved with respect to said frame in a back-and-forth direction of a vehicle. Therefore, the child seat can be attached with higher stability.

Said adjusting means consists of a feed-screw mechanism. Therefore, operation during adjusting is easy and an economical attachment can be implemented.

BRIEF DESCRIPTION OF THE DRAWINGS

FIG. 3 is an external perspective view of a one-way ratchet mechanism.

FIG. 5A is a diagram illustrating action of the attachment in a state in which the distance between a frame and a first engagement part is decreased and FIG. 5B is a diagram illustrating action of the attachment in a state in which the distance is increased.

DESCRIPTION OF THE PREFERRED EMBODIMENTS

Figure 1A:
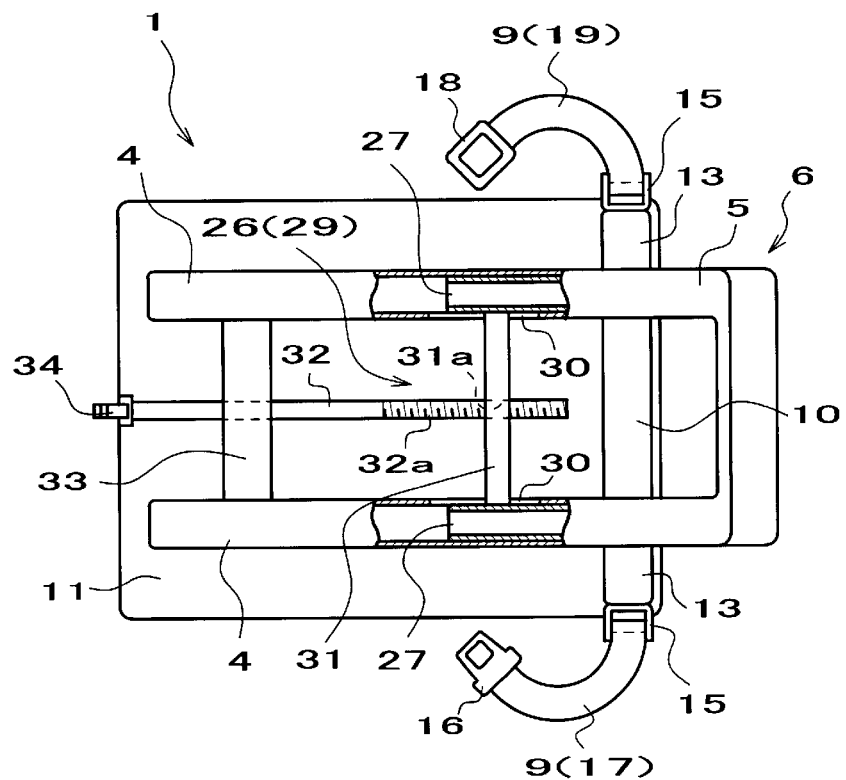
FIG. 1A is a plan view (a cutaway view in part) of an attachment and FIG. 1B is a side view (a cutaway view in part) thereof.
Figure 1B:
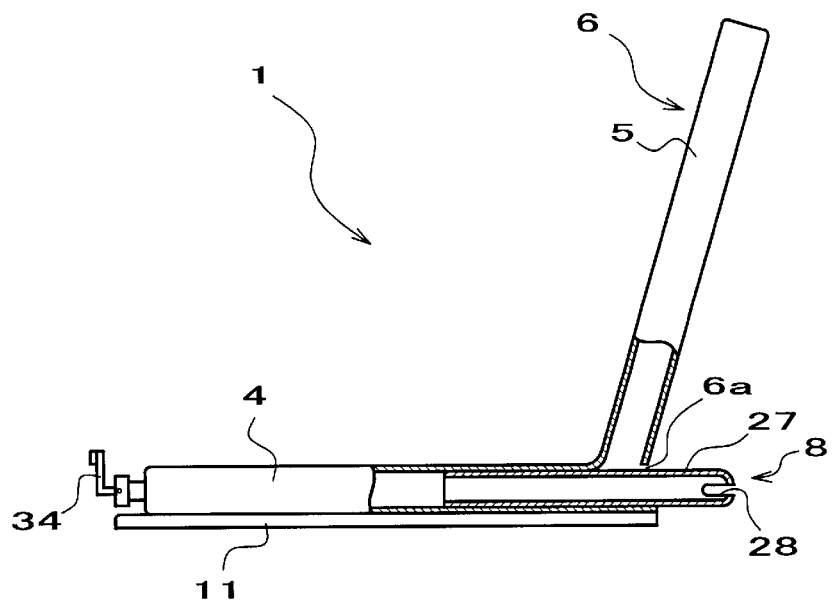
Figure 2:
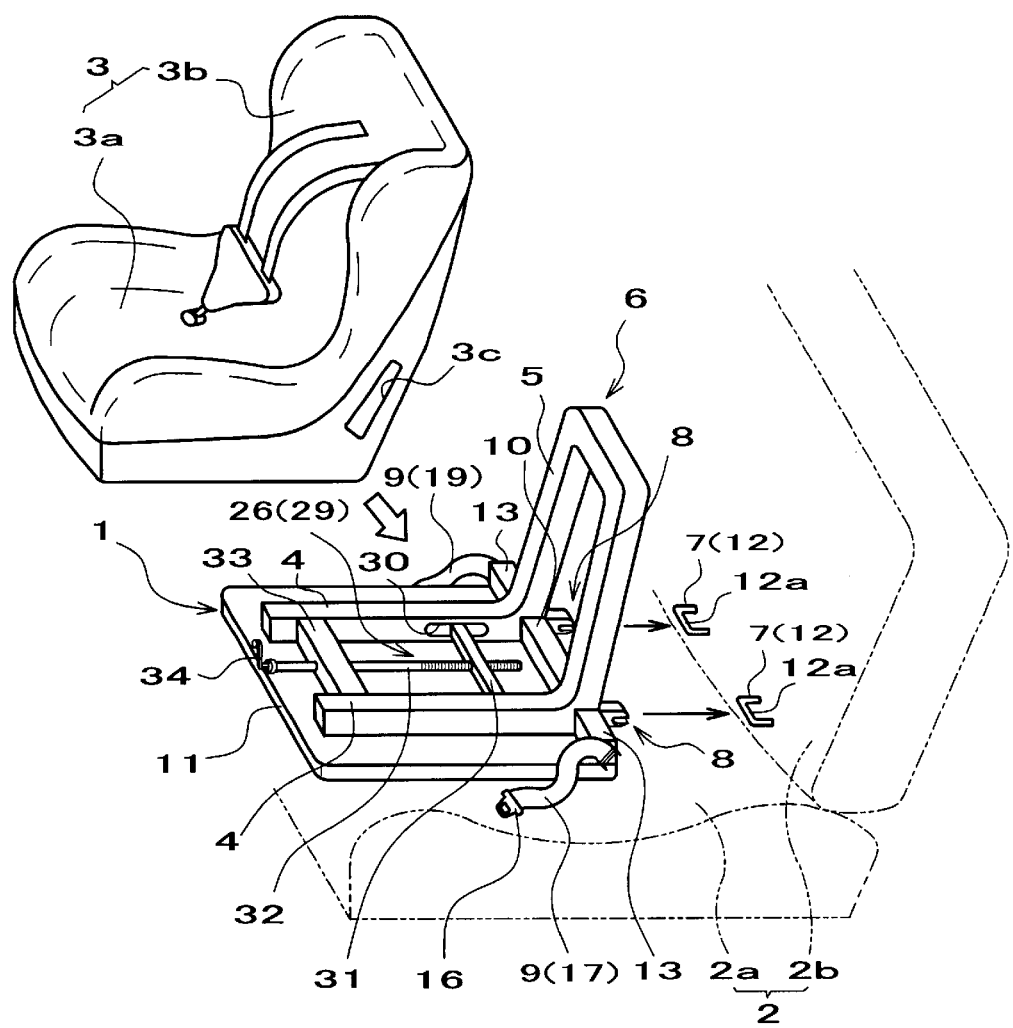
FIG. 2 is an external perspective view of the attachment and a child seat.
Figure 4A:
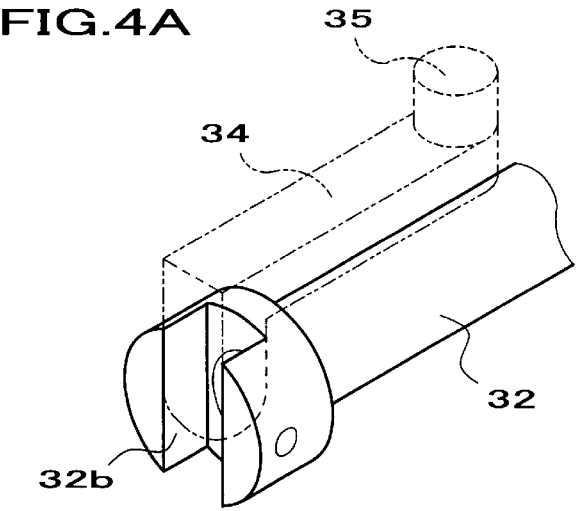
FIG. 4A is an external perspective view of a handle.
Figure 4B:
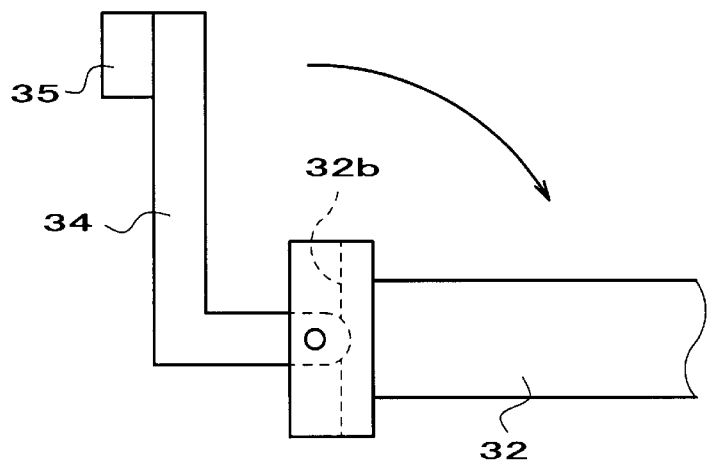
FIG. 4B is a side view showing a state using the handle and FIG. 4C is a side view showing a state without the use of the handle.
Figure 4C:
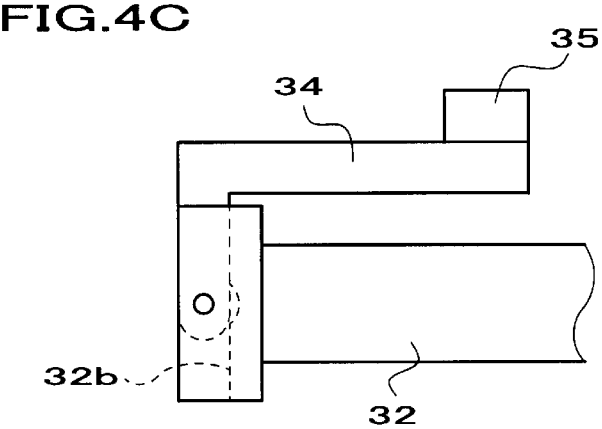

An attachment for a child seat according to the present invention (hereafter referred to as an attachment for simplicity) will now be described by referring to drawings. FIG. 1A is a plan view (a cutaway view in part) of an attachment and FIG. 1B is a side view (a cutaway view in part) thereof. FIG. 2 is an external perspective view of the attachment and a child seat. FIG. 3 is an external perspective view of a one-way ratchet mechanism. FIG. 4A is an external perspective view of a handle, FIG. 4B is a side view showing a state using the handle and FIG. 4C is a side view showing a state without the use of the handle. FIG. 5A is a diagram illustrating action of the attachment in a state in which the distance between a frame and a first engagement part is decreased and FIG. 5B is a diagram illustrating action of the attachment in a state in which the distance is increased.

In FIG. 1 and FIG. 2, the attachment 1 comprises the frame 6 having a seat side part 4, which faces a seat part 2a of a vehicle seat 2 and supports the backside of a seat part 3a of a child seat 3, and a back side part 5, which faces a back part 2b of the vehicle seat 2 and supports the backside of a back part 3b of the child seat 3; the first engagement part 8 made into engagement detachably with a second engagement part 7 provided on the back part 2b of the vehicle seat 2; and a fixing belt 9 fixing the child seat 3 to the frame 6.

The frame 6 consists of a bar, tubing and the like. In the present embodiment, one square pipe member is bent and molded to be the frame 6. One end part and another end part of the square pipe member are positioned having an appropriate spacing and extended in parallel with each other toward the rear of a vehicle to be the seat side parts 4, 4, respectively. The rear ends of the seat side parts 4, 4 of the frame 6 is bent upward to be inclined toward the rear side of the vehicle, and molded to be joined at the top ends. This upward bend part is the back side part 5. To ensure stiffness of the frame 6, a reinforcing member 10 made of a similar square pipe member is fixed between the seat side parts 4, 4.

When the seat side part 4 made of a bar, tubing and the like is set as-is on the seat part 2a of the vehicle seat 2, the seat side part 4 may be not convenient to be fitted with the seat part 2a and the seat part 2a may be burdened locally by weight of a child to deform the vehicle seat 2. Therefore, a rectangle base plate 11 is fixed on the underside of the seat side part 4 by fastening using a screw or the like and the base plate 11 is set on the seat part 2a. Thus, the fit of the attachment 1 is improved and the vehicle seat 2 is prevented from deforming or the like by dispersing the burdens on the vehicle seat 2. According to the shape of the backside of the seat part 3a of the child seat 3, the child seat 3 will be mounted directly on the base plate 11 without touching the seat side part 4 of the frame 6. In this case, the base plate 11 fits into "a seat side part which supports the backside of a seat part of a child seat" and constitutes a part of the frame 6.

As for the second engagement part 7 provided on the side of the vehicle seat 2, an anchor 12 defined by the "ISO-FIX" standard or the "child restraint anchorage system" standard is provided. The anchor 12 is, as shown in FIG. 2, made of a round bar, which is bent and molded in the shape of a U. A side-to-side pair of center arm parts 12a are provided along the width of the vehicle (in FIG. 2, an attaching member for attaching the anchor 12 and the like is omitted) to be made into engagement with the first engagement part 8 of the attachment 1. The place where the anchor 12 is set is not limited to the lower end of the back part 2b of the vehicle seat 2 as shown in FIG. 2. The anchor 12 may be retractable and detachable and can be positioned in the inside of the back part 2b.

On the other hand, the first engagement part 8 on the side of the attachment 1 is, for example, formed on the rear end of a slide member 27, as described later in detail. The first engagement part 8 is formed along the width of the vehicle and consists of a channel 28 and a hook member (not shown). The width of the channel 28 is slightly larger than the outside diameter of the anchor 12. The hook member is protruded into the channel 28 and controlled to rotate in only one direction for locking the anchor 12. The center arm part 12a of the anchor 12 is fitted into a predetermined position in the channel 28 to be locked by the hook member, therefore, the attachment 1 is fixed to the anchor 12.

Next, the fixing belt 9 will be described. Fixing belt attaching members 13 made of square pipe members are fixed on the rear ends of the seat side parts 4, 4 of the frame 6, respectively, outward in the vehicle width direction. The end part of the belt attaching member 13 has a lid. A belt 17 is attached on one end part and a belt 19 is attached on another end part via hardware 15, respectively. The hardware 15 is supported by a pin 14 (see FIG. 3), which acts as an axis wherein the hardware 15 can be shaken in a back-and-forth direction of a vehicle. A tang 16 is attached on the top of the belt 17 and a buckle 18 is attached on the top of the belt 19. These belts 17, 19 constitute the fixing belt 9 of the present invention. As shown in FIG. 2, the side bottoms of the child seat 3 generally have insertion holes 3c, 3c formed for drawing a vehicle seatbelt. The belts 17, 19 are drawn through this insertion holes 3c, 3c and the tang 16 is fitted into the buckle 18 and locked at the lower part of the child seat 3, therefore, the child seat 3 is fixed on the attachment 1. The lock of the tang 16 is released by pushing a release button of the buckle 18. The fixing belt 9 may be a plain weave belt of synthetic fiber and material and shape of the fixing belt 9 can be appropriately selected from anything having strength capable of restraining the child seat 3 solidly. The coupling system is not limited to the tang-buckle system.

A fastening adjustment means for the fixing belt 9 can be anything capable of fixing the child seat 3 to the attachment 1 integrally. In the present embodiment, from the viewpoint of ease of operation, the fastening adjustment means is the one-way ratchet mechanism 20 set on one of belts 17, 19. As shown in FIG. 3, the hardware 15 is equipped with a rotatable axis 21 winding the belt 17 (or 19). One end of the axis 21 has a ratchet gear 22 and a knob 23 for operating formed. The ratchet gear 22 and a hook member 25 are in constant mesh by the force of a tension spring 24. According to the above-described configuration, the knob 23 is rotated and the belt 17 (or 19) is wound to fix fixing the child seat 3 to the attachment 1. Therefore, when the fastening adjustment means for the fixing belt 9 is the one-way ratchet mechanism 20, the operation is only rotation of the knob 23. Thus, an unsophisticated user can fasten the fixing belt 9 with reliability and the child seat 3 does not rattle, as a result, safety is improved.

As described above, according to the attachment 1 comprising the frame 6 having the seat side part 4 and the back side part 5; the first engagement part 8 made into engagement detachably with the second engagement part 7 provided on the side of the vehicle seat 2; and the fixing belt 9, a conventional child seat can be fixed to a vehicle seat with ease and reliability without having to use a vehicle seatbelt. More specifically, the vehicle seatbelt is conventionally fastened in tight spaces in a state in which the child seat is set on the vehicle seat, however, according to the attachment 1, the fixing belt 9 can be fastened in large spaces. Therefore, fastening can be adjusted with ease. As a result of one-touch simple operation wherein the second engagement part 7 is made into engagement with the first engagement part 8, a child seat is fixed to a vehicle seat solidly. When a vehicle includes an anchor on the basis of the "ISO-FIX" standard or the "child restraint anchorage system" standard, an existing conventional child seat can be fixed on the basis of these standards.

The shape of the vehicle seat 2 varies with each vehicle type. When the first engagement part 8 is fixed with respect to the frame 6, depending on the vehicle seat 2, the attaching posture of the attachment 1, i.e., the posture of the child seat 3 may become unstable. Therefore, in the present embodiment, the attachment 1 has an adjusting means 26 adjusting the first engagement part 8 in a state in which the first engagement part 8 can be moved and positioned with respect to the frame 6. The first engagement part 8 is movable with respect to the frame 6 in the back-and-forth direction of a vehicle.

As shown in FIG. 1B, the rear end side of the seat side part 4 of the frame 6 has an opening 6a formed. The slide member 27 of square section is inserted and fitted in the seat side part 4 via the opening 6a wherein the slide member 27 can slide. The rear end of the slide member 27 has the first engagement part 8 formed. The first engagement part 8, as described above, consists of the channel 28 and the hook member (not shown), and is positioned being protruded from the opening 6a to the outside in a rear direction.

As for a mechanism, which slides the slide member 27 and can position at any given position, in the present embodiment, a feed-screw mechanism 29 is used from the viewpoint of ease of operation and economy. A slot 30 is drilled in the inside part of each seat side part 4 in the back-and-forth direction of the vehicle wherein the inside parts of the seat side parts 4, 4 are opposite to each other. The right and left slide members 27 are connected through the slot 30 via a connecting member 31 made of a square bar. A male screw 32a of a rod 32 is screwed in a female nut 31a set in a spiral at the center part of the connecting member 31. The rod 32 is supported by a supporting member 33 fixed solidly between the seat side parts 4, 4 and extended in the back-and-forth direction of the vehicle. A handle 34 is attached at the front end of the rod 32. According to the above-described configuration, when the handle 34 is rotated, the slide members 27, 27 are slid integrally. Therefore, the first engagement part 8 is moved in the back-and-forth direction of the vehicle and positioned at any given position by friction between the female nut 31a and the male screw 32a.

As for the position of the handle 34, the clearance between the child seat 3 and the base plate 11 is very narrow, therefore, in consideration of ease of operation of the handle 34, the handle 34 has no choice but to be protruded toward the front of the frame 6 and the base plate 11. However, the protrusion part is an obstacle in limited interior space of the vehicle and may make contact with the feet of a child. For this reason, in the present embodiment, when the handle 34 is not used, the handle 34 can be folded (raised and tilted) for not protruding. For example, as shown in FIG. 4A, the handle 34 is L-shaped. A knob 35 for operating is attached on one side of the handle 34 and another side of the handle 34 is rotatably supported within a channel 32b formed at the tip of the rod 32. According to this configuration, when the handle 34 is used, as shown in FIG. 4B, the handle 34 is raised, the knob 35 is grasped to rotate the handle 34 and the feed-screw mechanism 29 is operated. When the handle 34 is not used, as shown in FIG. 4C, the handle 34 is tilted toward the rear of the vehicle. Therefore, the protrusion part, which is protruded toward the front of the frame 6 and the base plate 11, can be gone, or the dimensions thereof can be reduced. As a consequence, interior space of the vehicle can be used with efficiency.

The adjusting means 26 is certainly not limited to the above-mentioned feed-screw mechanism 29. For example, a plurality of convex or concave parts may be formed having an appropriate spacing in the back-and-forth direction of the vehicle on the side of the frame 6 or a member forming the first engagement part 8 (the slide member 27). A lock member made of a hook or pin may be provided. The hook or pin is made into engagement with the convex or concave part. Thus, the configuration of the adjusting means 26 is appropriately selected.

Next, operation of the attachment 1 having the above-described configuration will be described. First, the seat part 3a and the back part 3b of the child seat 3 are held against the seat side part 4 and the back side part 5 of the frame 6. The belts 17, 19 are drawn through the insertion holes 3c, 3c, the tang 16 is fitted into the buckle 18 and locked, and the belts 17, 19 are fasten by the one-way ratchet mechanism 20. Therefore, the child seat 3 is fixed on the attachment 1 integrally. The first engagement part 8 of the attachment 1 is subsequently made into engagement with the second engagement part 7 provided on the side of the vehicle seat 2 (the anchor 12).

When a clearance between the attachment 1 and the back part 2b appears according to the shape of the vehicle seat 2, or as shown in FIGS. 5A, 5B, according to variations in the angle of inclination of the back part 2b, the handle 34 adjusts the position of the frame 6 with respect to the first engagement part 8. For example, as shown in FIG. 5A, when the angle of inclination of the back part 2b is large, the distance between the frame 6 and the first engagement part 8 is reduced. Conversely, as shown in FIG. 5B, when the angle of inclination of the back part 2b is small, the distance between the frame 6 and the first engagement part 8 is increased. In both cases, the back side part 5 of the frame 6 makes contact with the back part 2b. The handle 34 is operated for the back side part 5 pressing the back part 2b and the attachment 1 can be prevented from rattling with respect to the vehicle seat 2, i.e., the child seat 3 does not rattle. Therefore, the child seat 3 is fixed on to the vehicle seat 2 with reliability.

The above-described "ISO-FIX" standard or "child restraint anchorage system" standard defines that the distance between the hip point HP (see FIG. 5A) of the child seat 3 in the back-and-forth direction of the vehicle and the anchor 12 must be within a predetermined range. Therefore, a configuration in which the first engagement part 8 is movable with respect to the frame 6 in the back-and-forth direction of the vehicle, such as the present configuration, can support variations between a different position of the hip point HP for each type of the child seat 3. The child seat 3 in keeping with the above-described standards then can be attached.

The present invention produces the following effects.
(1) According to an attachment comprising a frame having a seat side part and a back side part; a first engagement part made into engagement detachably with a second engagement part provided on the side of a vehicle seat; and a fixing belt, a conventional child seat, which is fixed by a vehicle seatbelt, can be fixed to the vehicle seat with ease and reliability without having to use a vehicle seatbelt. Particularly, when an anchor provided on the side of the vehicle seat supports the "ISO-FIX" standard or "child restraint anchorage system" standard, the above-mentioned existing conventional child seat can be fixed on the basis of these standards. Therefore, there is no necessary to buy a new child seat in keeping with these standards and an increase in the amount of waste items can be controlled.
(2) The attachment for a child seat has an adjusting means adjusting the first engagement part in a state in which the first engagement part can be moved and positioned with respect to the frame. Therefore, the position (posture) of the child seat with respect to the vehicle seat when attaching can be optimized. The child seat can be attached without a rattle with stability.
(3) The first engagement part can be moved with respect to the frame in a back-and-forth direction of a vehicle. Therefore, the child seat can be attached in a state in which the attachment is pressed to the back part of the vehicle seat, and stability is improved.

The present configuration can support variations between a different position of the hip point HP for each type of the child seat and the child seat then can be attached in keeping with the "ISO-FIX" standard or "child restraint anchorage system" standard.
(4) The adjusting means consists of a feed-screw mechanism. Therefore, the child seat can be moved in the back-and-forth direction of the vehicle and positioned at any given position easily, and ease of operation is improved. Moreover, the mechanism is simple, therefore, an economical attachment can be implemented.

What is claimed is:
1. An attachment for attaching a child seat to a vehicle seat comprising: a frame integrally formed as a single unit having parallel seat side parts, which face a seat part of said vehicle seat and support the backside of a seat part of said child seat, a backside part, which faces a back part of said vehicle seat and supports the backside of a back part of said child seat, and reinforcing and supporting members positioned between said parallel seat side parts, wherein said supporting member is disposed toward a front end of said parallel seat side parts and said reinforcing member is disposed toward a rear end of said parallel seat side parts; a first engagement part moved into engagement detachably with a second engagement part provided on the back part of said vehicle seat; a fixing belt fixing said child seat to said frame and said attachment further comprising a base plate, which is fixed to the underside of said seat side part of the frame, and stably positions said child seat on said seat part of said vehicle seat, wherein said child seat is supported by said base plate in addition to said seat side part of said frame.

2. The attachment for a child seat as claimed in claim 1, further comprising an adjusting means adjusting said first engagement part in a state in which said first engagement part can be moved and positioned with respect to said frame.

3. The attachment for a child seat as claimed in claim 2, wherein said adjusting means can move said first engagement part with respect to said frame in a back-and-forth direction of a vehicle.

4. An attachment for attaching a child seat to a vehicle seat comprising: a frame formed as a single unit having a seat side part, which faces a seat part of said vehicle seat and supports the backside of a seat part of said child seat, and a back side part, which faces a back part of said vehicle seat and supports the backside of a back part of said child seat; a first engagement part moved into engagement detachably with a second engagement part provided on the back part of said vehicle seat; a fixing belt fixing said child seat to said frame; and an adjusting means consisting of a feed-screw mechanism adjusting said first engagement part in a state in which said first engagement part can be moved and positioned with respect to said frame.

5. The attachment for attaching a child seat to a vehicle seat according to claim 1, wherein said fixing belt has a belt length adjustor for adjusting the length of said fixing belt.

6. The attachment for attaching said child seat to said vehicle seat according to claim 5, wherein said belt length adjustor is a one-way ratchet mechanism.

7. An attachment for attaching a child seat to a vehicle seat comprising: a frame which has a base frame and a back frame, wherein said base frame stably supports the underside of the seat part of said child seat and the underside of said seat part of said child seat comes in contact with almost all of said base frame, and said back frame stably supports the rear side of said backrest part of said child seat and the rear side of said backrest part of said child seat comes in contact with almost all of said back frame; a linkage, which is detachably attached to a anchor provided at said vehicle seat and fixes said frame to said vehicle seat; a pair of fixing belts, each of which is separately provided at the side ends of said frame and fixes said child seat to said frame; and said attachment further comprising: said base plate, which is fixed to the underside of said base frame and stably positions said child seat on said vehicle seat, wherein said child seat is supported by said base plate in addition to said frame.

8. The attachment for attaching a child seat to a vehicle seat according to claim 7, wherein each of said fixing belts is attached to a fixing belt attaching member, respectively, which is provided at either end of said frame, and wherein at least one of said fixing belts has the belt length adjustor, which adjusts the length of said fixing belt.

9. The attachment for attaching a child seat to a vehicle seat according to claim 8, wherein said belt length adjustor is the one-way ratchet mechanism.

10. An attachment for attaching a child seat to a vehicle seat comprising: a frame which has a base frame and a back frame, wherein said base frame stably supports the underside of the seat part of said child seat and the underside of said seat part of said child seat comes in contact with almost all of said base frame, and said back frame stably supports the rear side of said backrest part of said child seat and the rear side of said backrest part of said child seat comes in contact with almost all of said back frame; a linkage, which is detachably attached to a anchor provided at said vehicle seat and fixes said frame to said vehicle seat; a pair of fixing belts, each of which is separately provided at the side ends of said frame and fixes said child seat to said frame; and said attachment further comprising an adjustor consisting of the feed-screw mechanism adjusting said linkage, wherein said linkage can be moved and positioned with respect to said frame.

* * * * *